United States Patent
Van Steenwyk et al.

(10) Patent No.: US 7,434,482 B1
(45) Date of Patent: Oct. 14, 2008

(54) FEEDBACK-CONTROLLED PIEZOELECTRIC FORCE MEASURING APPARATUS

(75) Inventors: Donald H. Van Steenwyk, Paso Robles, CA (US); Harold T. Buscher, Los Osos, CA (US)

(73) Assignee: Applied Technologies Associates, Inc., San Marino, CA (US)

( * ) Notice: Subject to any disclaimer, the term of this patent is extended or adjusted under 35 U.S.C. 154(b) by 0 days.

(21) Appl. No.: 11/880,702

(22) Filed: Jul. 25, 2007

(51) Int. Cl.
*G01L 1/10* (2006.01)
(52) U.S. Cl. .................................... 73/862.625
(58) Field of Classification Search ............ 73/862.625, 73/862.634, 862.639; 310/328, 316.03; 345/173
See application file for complete search history.

(56) References Cited

U.S. PATENT DOCUMENTS

| | | | |
|---|---|---|---|
| 4,622,483 A * | 11/1986 | Staufenberg et al. | 310/328 |
| 6,053,051 A * | 4/2000 | Yamada | 73/777 |
| 6,381,381 B1 * | 4/2002 | Takeda et al. | 385/16 |
| 7,187,152 B1 | 3/2007 | Tsai | |
| 7,210,394 B2 | 5/2007 | Yajima et al. | |
| 7,211,979 B2 | 5/2007 | Khatib et al. | |
| 7,222,016 B2 | 5/2007 | Snowbarger et al. | |
| 7,367,242 B2 * | 5/2008 | Xi et al. | 73/862.625 |
| 2005/0151445 A1 * | 7/2005 | Titschert et al. | 310/316.03 |
| 2007/0146334 A1 * | 6/2007 | Inokawa | 345/173 |

* cited by examiner

*Primary Examiner*—Jewel V Thompson
(74) *Attorney, Agent, or Firm*—William W. Haefliger

(57) ABSTRACT

A feedback-controlled force measuring apparatus with a force input element, a piezoelectric force generating element and a precision motion detection element in a feedback-controlled loop. Two embodiments are described. In one the force-generating element is a supported proof mass to sense linear acceleration, and in the other the force-generating element is a diaphragm supported to sense external pressure. The precision motion detection element employs resistance and inductance of a case-fixed coil of wire modulated by the distance from the coil to an electrically-conductive member connected to a force-generating element. The piezoelectric force generating element may be either a bimorph, or a piezoelectric stack.

14 Claims, 3 Drawing Sheets

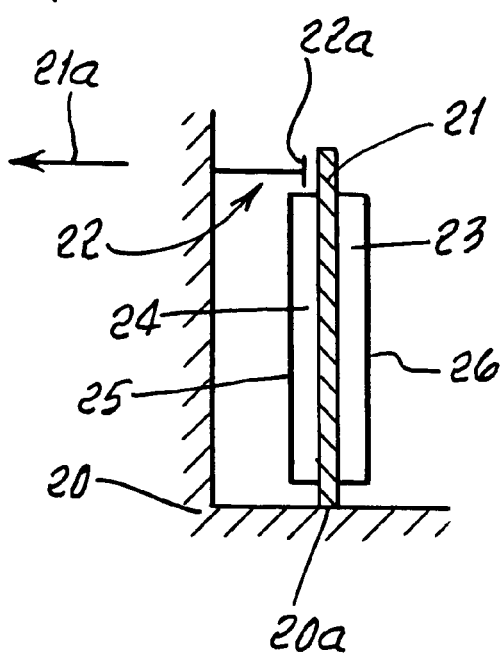
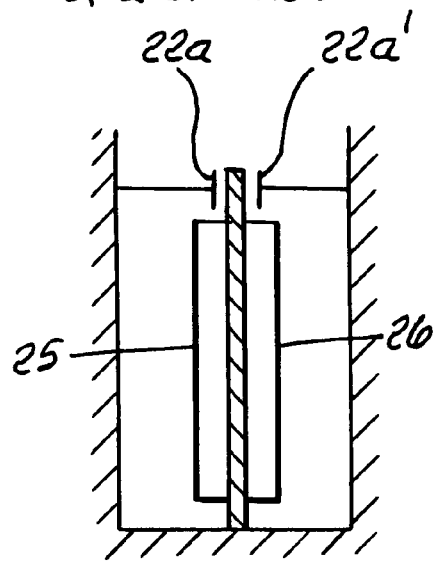
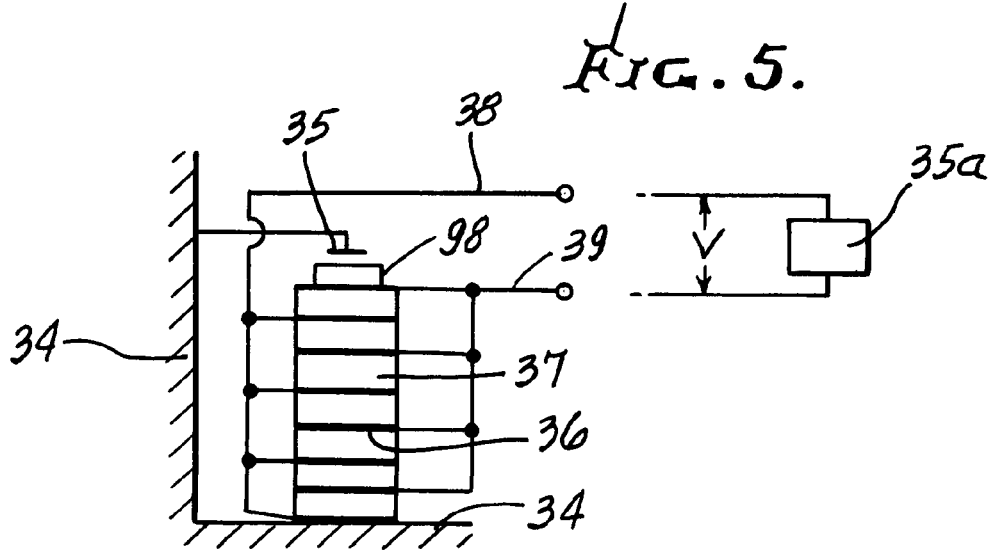

FEEDBACK-CONTROLLED PIEZOELECTRIC FORCE MEASURING APPARATUS

BACKGROUND OF THE INVENTION

There are many applications for precision force measurement devices. One application is measuring acceleration. Other applications include measuring forces on gyroscopes, use in seismography, in microphones and geophones, controlling positioners, in inclinometers, surface-tensionometers, in flow and pressure measurement instruments, sensing forces on wind-tunnel models, in active vibration damping systems, and in dynamic balancing of rotating machinery.

Most force measuring devices are not of the force-balance type, which involves feedback position stabilization of a moving "sense" element. They do not use feedback control, but simply measure the free motion of an element experiencing external force and then relate this motion to the force applied. These are generally known as open-loop type devices, rather than closed-loop type devices of the present invention. Some production devices do use a piezoelectric element as a force sensor, always without feedback control. When the piezo elements deform due to applied force, they produce a voltage on attached electrodes, non-linearly related to that force. Most of these piezo-based instruments are "bearingless" structures—they indirectly measure position change due to external force applicationon a mass supported by elastically-deformable restraints. This results in very long life and good stability over time, as well as good shock and vibration resistance. However, most do not exhibit very high accuracy or repeatability. One percent accuracy would be considered very good, whereas most are in the three to five percent range.

The present invention is aimed at applications requiring more accuracy, generally well under one percent, along with the ability to withstand harsh vibration and shock environments. The invention is based on combining the force-balance feedback stabilization principle with a piezoelectric force generating element that generates its own rebalancing force in response to a voltage feedback control. This provides a number of significant improvements illustrated by describing their use in a common linear accelerometer force sensing application and in a pressure gauge that has a diaphragm supported to sense external pressure. Many existing open-loop accelerometers use the deflection of a piezoelectric element under acceleration forces to generate a voltage related to its deflection. U.S. Pat. No. 6,655,211 illustrates an example. Voltage is measured and converted to an acceleration, often using a calibration table stored in electronic memory to compensate for non-linearity in the sensing element. No open-loop pressure gauges are believed currently known using piezoelectric elements for readout.

There are two broad classes of piezo-based force generating elements—"blocks" and "bimorphs". Both are used in accelerometers, but the bimorphs are more common. The blocks are solid pieces of material with conductive electrodes deposited on them in locations chosen to maximize electrical-to-motion coupling for a given deformation ("mode"). Practical motion is very small, usually under a few micro-inches. Bimorphs are thin sandwiches made of a metal core between two layers of piezo material bonded to it. They are usually made as strips, much narrower than they are long. The electrodes are the core and thin conductive sheets deposited on the outside faces of the piezo layers. With proper design, these sandwich structures can bend under applied voltages. The two long-direction ends move up or down relative to the center of the strip. Notions are typically relatively large. If one end is clamped down, the opposite end can move many thousands of micro-inches. Both blocks and bimorphs can be stacked on top of one another. For blocks, this results in taller structures that provide more free-end motion at lower drive voltage than would a single block of the same height with electrodes only at its ends. For bimorphs, this results in a stiffer sandwich capable of exerting more force at its tip for a given voltage than a single bimorph. Both blocks and bimorphs can be clamped down at one end, or, in the middle, or somewhere else. This results in one, two or more ends that are free to move under force application. Several suppliers produce usable piezoelectric materials. One vendor in the United States offering a particularly-wide variety of materials and designs is PI (Physik Instrumente) of Auburn, Mass.

Piezoelectric materials are somewhat reciprocal. They will change shape in response to applied electric fields (usually produced by voltages on electrodes). They will also produce similar voltages on those electrodes when mechanically deflected the same amount by outside forces. This latter effect is what most piezoelectric open-loop accelerometers employ.

All piezoelectric materials also exhibit inherent hysteresis—a failure to return exactly to a prior position/voltage output after experiencing a large deflection in one direction. They are also inherently non-linear—voltage and motion are not directly proportional. However, the force exerted by the element is much closer to linear with applied voltage. This hysteresis and the inherent nonlinearities are what limit the accuracy and repeatability of current piezo accelerometers. They can be numerically corrected, but this is rarely done due to the complexity of the calculations and required memory. For those devices designed to measure constant accelerations (like gravity), a third error source is the draining off of charge from the piezo material by the measuring circuits over time.

Present open-loop piezo accelerometers are essentially voltmeters hooked to electrodes on a piezo material. When the piezo material deforms under acceleration forces, the voltage produced on the electrodes is read.

SUMMARY OF THE INVENTION

The present invention avoids the above problems by using a feedback loop to apply voltages to the piezo force generating element (a block, bimorph or stack of either), that keep it from experiencing significant motion under outside forces. The voltage required to keep it stationary is directly proportional to the force its free and experiences. It is possible to accurately generate this voltage because the element's tip position is reported by a simple, non-contact precision motion detection element with sub-micro-inch resolution.

An important objective of the present invention is to provide an improved feedback-controlled piezoelectric force measuring apparatus having high accuracy and very good environmental survival characteristics. Embodiments showing application of the principles of the invention to the measurement of linear acceleration and pressure are described herein.

The invention provides an improved external force measuring apparatus, comprising:
  a) a piezoelectric force-generating element having one fixed end attached to a fixed frame and the other, free end, to receive force from a force input element,
  b) first means for sensing the position of said free end of said force input element, for generating a signal proportional to a position of said free end of said element; said means comprising:

i) an electrically conductive element mounted on said force input element, and ii) one or more inductive coils mounted on said fixed frame adjacent to or near said conductive element, c) second means for using said signal to generate a voltage to control the position of said piezoelectric force generating element's free end, such that said free end maintains a substantially constant location, despite existence of externally applied forces via closed-loop feedback position control and d) third means to interpret said voltage applied to said piezoelectric element in terms of a scaled measure of said external force.

Specific embodiments include the use of a proof mass so that the sensed input quantity is linear acceleration and the use of a mechanical pressure-blocking diaphragm so that the sensed input quantity is an external pressure.

DRAWING DESCRIPTION

FIG. 4a is a drawing of a configuration of the invention using a piezoelectric bimorph in an acceleration sensing apparatus;

FIG. 4b is a drawing of a configuration of the invention using a dual-coil precision motion sensing element in the apparatus of FIG. 4a.

FIG. 5 is a drawing of a configuration of the invention using a stack of piezoelectric blocks in an acceleration sensing apparatus;

DETAILED DESCRIPTION

Figure 1:
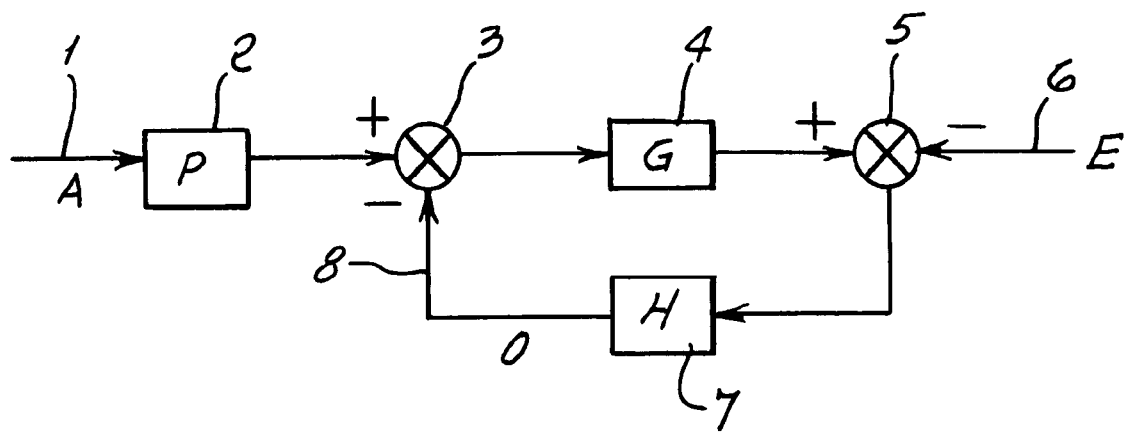
FIG. 1 is a block diagram of the elements of the present invention.

FIG. 1 illustrates a block diagram for a feedback controlled closed-loop sensor, for example a pendulous accelerometer. An input acceleration acting at 1 on a pendulous mass 2 results in an input torque applied to a differential element 3. That torque is then applied to the pendulum transfer function, G 4, resulting in output motion applied to a differential detector 5 that measures the difference between the pendulum motion and the instrument case. A position-detection error signal E 6 may be combined with the signal 5 and applied to the feedback element H 7 that generally includes some signal amplification and a force generation element. The feedback element 7 output, O 8, is subtracted from the input from the pendulous mass 3, and the difference is fed to the input of G 4. The relation of the output O 8 to the input A 1 is O/A=P (GH/(1+GH)) and when the so-called loop gain, GH, is large compared to a value of unity O=A, the purpose of the measuring loop is met. One important potential error source in such loops is any position-detector error signal E 6. For many pendulous accelerometers the Laplace transfer function for the pendulum, G 6, is of the form $G=1/(Js^2+Ds+K)$ where J is the moment of inertia, often expressed in dyne-cm-seconds$^2$, where D is the viscous damping often expressed in dyne-cm-seconds, K is the spring constant often expressed in dyne-cm/radian, and s is the Laplace frequency operator in units of inverse seconds. It may be shown then that the response to a step change in position-sensor error signal E is output O=EK. Thus in good designs for high-accuracy sensing, either the spring constant K or the error signal E must be kept very small. The best practice keeps both small but the importance of minimizing changes in the null offset of the position sensor must be emphasized.

Figure 2:
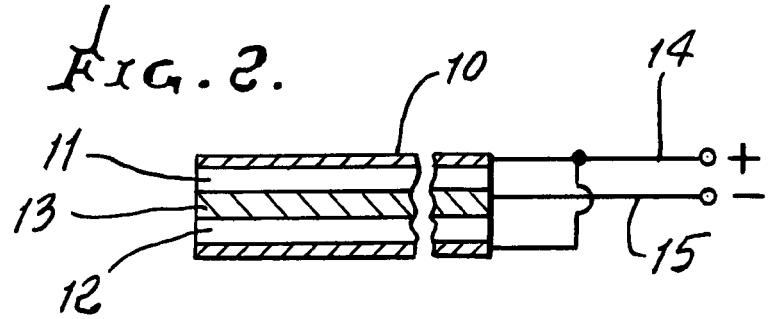
FIG. 2 is a drawing of a piezoelectric bimorph for use in the invention.
Figure 3:
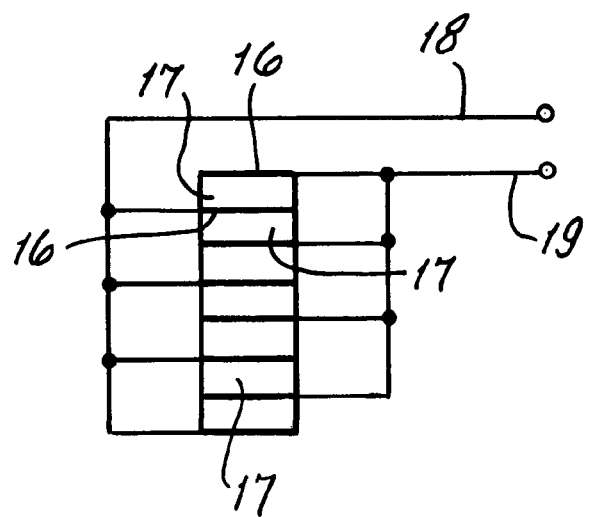
FIG. 3 is a drawing of a stack of piezoelectric blocks for use in the invention.

The fundamental basic element of the present invention is the use of a piezoelectric force-generating element in a feedback-controlled closed loop sensor operation. FIG. 2 shows one form of such a force-generating element generally known as a piezoelectric bimorph. A central metal element 13 has two sections of piezoelectric material 11 and 12 attached thereto. Thin metal coatings 9 and 10 complete the bimorph structure. These two are connected together electrically to lead 14. The central metal element 13 is connected to lead 15. When an external voltage is applied between the leads 14 and 15, the piezoelectric material changes dimension, resulting in a force tending to bend the central metal element 13. In the dual-piezoelectric-element shown, the piece 10 on one side lengthens and the piece 9 on the other side shortens. Reversal of the sign of the impressed voltage reverses the sign of the resulting force. FIG. 2 shows one type of force-generating element for use in the invention. FIG. 3 shows another type of piezoelectric force-generating element, generally known as a piezoelectric stack. A collection of blocks 17 of piezoelectric material is formed with metallic interleaved elements 16. One set of interleaved elements 16 is connected to lead 18 and the remaining set of elements is connected to lead 19. When a voltage is applied between the leads 18 and 19, the length of the stack in the stacking direction of the stack changes. When the sign of the voltage is reversed the change in length of the stack is reversed. In this configuration the motion is along the direction of the stack in comparison to FIG. 2 wherein the resulting motion is a bending of the central metal element. Thus FIG. 3 shows an alternative type of force-generating element for use in the invention.

FIG. 4a shows the basic elements of a piezoelectric force-feedback linear accelerometer. An external case 20 mounts at 20a a flexible electrically-conductive metallic central element 21, which has two piezoelectric elements, 23 and 24, mounted on either side. Metal coatings 25 and 26 complete the so-called bimorph structure. An external input acceleration of the case 20 in a direction 21a normal to the long dimension of the metallic central element 21 causes a bending motion in the element 21, and a change in the distance between that element and the case 20. A precision motion detector 22 is shown mounted to the external case 20, to respond to the distance between an electrical coil in or part of the detector 22 and the conducting end of the metal central element 21. The non-contact inductive pickoff comprises a flat coil 22a of wire (part of 22) placed next to the metal central element 21. The coil and the metal element extend parallel to the plane of the bimorph. The resistance and inductance of the coil are both changed as the distance between the coil and the metal element changes. This is the result of eddy currents induced in the metal element by currents in the coil. In general, as the spacing between the coil and the metal element 21 decreases, the resistance of the coil increases and the inductance of the coil decreases. Either or both of these changes may be employed in a variety of electronic circuits, to provide an electrical indication of the position of the metal central element 21 relative to the external case 20. The output signal is then amplified, as discussed in relation to FIG. 1, and the resulting control voltage is applied to the piezoelectric bimorph to create a balancing force to restore the metal central element to its original position. Thus the control voltage is a direct electrical measure of the input acceleration.

FIG. 4b shows an alternative to FIG. 4a and employing a dual precision motion sensor 25 and 26. Other elements in FIG. 4b correspond to similar elements in FIG. 4a. The dual-coil precision motion sensor provides differential compensation for any common-mode variations in the two coils 22a and 22a', such a change in the resistance of the coil wire due to a change in temperature. Similarly, any change in the resistivity of the metal central element causes a balanced effect on the two individual coils and thus does not result in a change in the null position of the motion detector. A dual-coil configuration shows twice the sensitivity to motion as the single-coil configuration, since as the signal from one increases, the signal from the other decreases. Other than the difference in the coil configuration, the apparatus shown in FIG. 4b operates the same as the apparatus shown in FIG. 4a.

FIG. 5 shows the basic elements of another embodiment of a piezoelectric force-feedback linear accelerometer using a stack of piezoelectric blocks similar to that shown in FIG. 3. In FIG. 5 an external case 34 supports a stack of piezoelectric blocks 37 that are interleaved with metal layers 36. A linear acceleration along the axis of the stack of blocks will cause the stack to lengthen or shorten in relation to the acceleration level. This change of length is sensed by the precision motion sensor 35 which is a single-coil element as previously described in connection with the discussion of FIG. 4a. The output of the precision motion sensor is amplified by external electronic circuitry as at 35a to generate a control signal voltage V that is applied, in a negative-feedback sense to the leads 38 and 39 to restore the length of the piezoelectric stack to its normal un-accelerated length. This control voltage therefore becomes a direct measure of the input linear acceleration along the axis of the stack. The sensitivity of the device may be increased by adding an additional proof mass 98 (see FIG. 6) on top of the stack between the indicated top metal layer 36 and the precision motion sensor 35. This increase in mass causes a greater deflection of the stack under acceleration and thus requires a greater signal control voltage to be applied to the leads 38 and 39. Further, it is possible to have a metal plate on the top of the stack that extends beyond the side of the stack such that a dual-coil precision motion sensor as discussed above in relation to FIG. 4b may be used. See FIG. 6. The same advantages of differential compensation for certain effects as discussed in connection with FIG. 4b exist.

Figure 6:
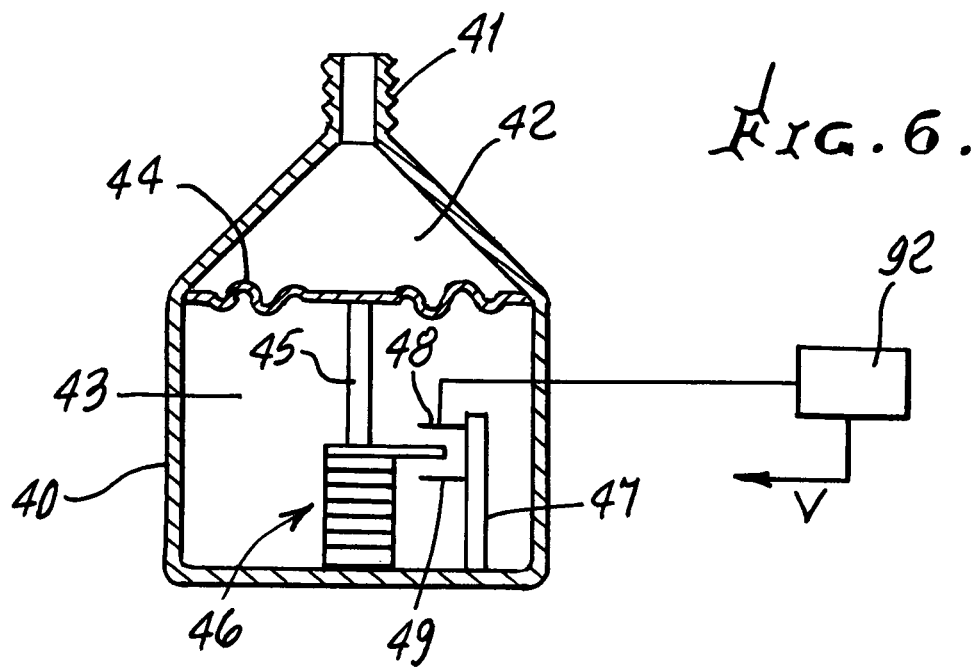
FIG. 6 shows a drawing of a configuration of the invention using a stack of piezoelectric blocks in a pressure sensing apparatus.

FIG. 6 shows the basic elements of a piezoelectric force-feedback pressure gauge embodiment 90 of the present invention. An external case 40, having a threaded connection 41 for connection to a pressure source, contains an internal chamber 42 having access to the external pressure to be measured. A flexible diaphragm 44 separates the internal chamber 42 from a sensor chamber 43 that contains the measurement apparatus. The measurement apparatus includes a force-contact post 45 to transmit force from the flexible diaphragm 44 to a stack 46 of piezoelectric blocks. That stack is equivalent in function to the stack shown in FIG. 3 and FIG. 5. An increase or decrease in the pressure of the fluid in the internal chamber 42 is transferred to the stack 46 by the forces-contact post 45, resulting in a change in the length of the stack. Such change in length is detected by a dual precision motion sensor 48 and 49 mounted to the external case or frame by post 47. The output of the precision motion sensor is amplified by external electronics 92 to generate a control signal voltage V that is applied, in a negative-feedback sense, as in FIG. 5 to the piezoelectric stack to restore the length of the piezoelectric stack to its normal un-pressurized length. Accordingly, the control signal voltage becomes a direct measure of the input pressure in the internal chamber 42.

Those skilled in the art will recognize that the concept of a piezoelectric force generating element motion controlled by a feedback loop, is an important feature of the present invention. It also shares the ruggedness and long life of piezoelectric sensors.

The basic elements of the invention are useful in applications other than accelerometers or pressure gauges, with the forces to be measured applied directly to a bimorph, or stack force generating element (or, to a mechanism attached to it), rather than being induced in a proof mass by acceleration or a diaphragm for a pressure gauge.

Figure 7:
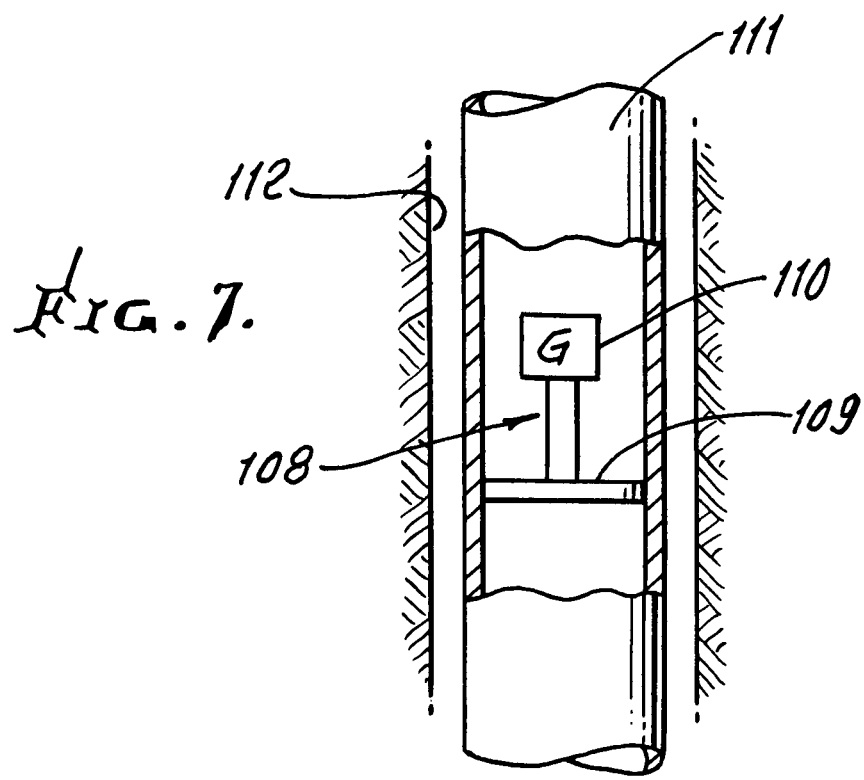
FIG. 7 shows an application of the invention to equipment in a drill string in a well.

Examples of such input force transfer mechanisms are suspended in a drill string 111 in a well 112, and using the piezoelectric element 108 itself as part of the support 109 for a gyroscope 110 having significant angular momentum as a means for measuring inertial angular rate (see FIG. 7); and/or using the piezoelectric element itself as part of the support for a balanced inertial mass 110a as a means for measuring inertial angular acceleration; as in drill string in a well. Other examples include extended and appropriately-shaped paddles surrounded by fluid or gas for seismology, microphones, geophones, flow sensors; extended mechanical probe attachments for wind tunnel model and for vibration damping and dynamic balancing applications. In such examples, the piezoelectric element is used as a support for such apparatus.

In applications requiring either operation in high vibration environments or extreme sensitivity (or both), the sensing element of the piezoelectric force-measuring apparatus can be immersed in a selected density and viscosity liquid. This damps (averages) rapidly time-changing forces, and can also increase sensitivity to weak forces.

All such applications for the feedback-controlled piezoelectric force generating element measuring apparatus, while not individually described in detail, are believed to lie within the limitations of the basic independent claim 1 below.

We claim:

1. An improved external force measuring apparatus, comprising:
    a) a piezoelectric force generating element having one fixed end attached to a fixed frame and the other, free end, to receive force from a force input mechanism,
    b) first means for sensing the position of said free end of said force generating element, and for generating a signal proportional to a position of said free end of said element; said means comprising:
        i) an electrical conductive element mounted on said force generating element, and
        ii) one or more inductive coils mounted on said fixed frame adjacent to or near said conductive element means,
    c) second means for using said signal to generate a voltage to control the position of said piezoelectric force generating element's free end, such that said free end maintains a substantially constant location, despite existence of externally applied forces, via closed-loop feedback position control and
    d) third means to interpret said voltage applied to said piezoelectric element in terms of a scaled measure to said external force.

2. The apparatus of claim 1 in which said piezoelectric force generating element is a piezoelectric bimorph.

3. The apparatus of claim 1 in which said piezoelectric force generating element is a stack of piezoelectric blocks.

4. The apparatus of claim 1 in which said position sensing means includes an inductive coil mounted on said fixed frame adjacent to said conductive element.

5. The apparatus of claim 1 in which said position sensing means includes at least two inductive coils mounted on said fixed frame adjacent to said conductive element.

6. In combination
   i) force measuring apparatus as defined in claim 1,
   ii) a support for said apparatus, in a drill string in a well,
   iii) and at least one of the following carried by the support:
      a gyroscope having significant angular momentum, operable for measuring inertial angular rate
      a balanced inertial mass operable for measuring inertial angular acceleration.

7. An apparatus for measuring linear acceleration comprising:
   a) a piezoelectric force generating element having one fixed end attached to a fixed frame and the other, free end, bearing a proof mass for generating a force proportional to an input linear acceleration,
   b) first means for sensing the position of an free end of said proof mass and for generating a signal proportional to a position of said proof mass end; said sensing means comprising:
      i) an electrical conductive element mounted on said proof mass and
      ii) one or more inductive coils mounted on said fixed frame adjacent to or near said conductive element,
   c) second means for using said signal to generate a voltage to control the position of said piezoelectric element's free end such that it maintains substantially constant location, despite existence of externally applied forces via closed-loop feedback position control, and
   d) means to interpret said voltage applied to said piezoelectric element in terms of a scaled measure of said external linear acceleration.

8. An apparatus for measuring external pressure in a liquid or gas comprising:
   a) a piezoelectric force generating element having one fixed end attached to a fixed frame and the other, free end, contacting a flexible diaphragm for generating a force proportional to an input external pressure,
   b) first means for sensing the position of said free end contacting said flexible diaphragm for generating a signal proportional to positioning of said flexible diaphragm; said sensing means comprising:
      i) an electrical conductive element mounted to sense diaphragm movement, and
      ii) one or more inductive coils mounted on said fixed frame adjacent to or near said conductive element,
   c) second means for using said signal to generate a voltage to control the position of said diaphragm such that it maintains a substantially constant location despite existence of externally applied forces, via closed-loop feedback position control, and
   d) third means to interpret said voltage applied to said piezoelectric element in terms of a scaled measure of said external pressure.

9. Force measuring apparatus, comprising, in combination:
   a) a piezoelectric force generating element having a fixed portion and a freely movable portion spaced from said fixed portion,
   b) position sensing means for sensing the position of said freely movable portion, and operable to generate a control signal which is a function of the sensed position of said freely movable portion,
   c) feedback control means including circuitry responsive to said control signal to generate voltage for controlling the position of said element freely movable portion, whereby said position is maintained at substantially the same location despite transmission of an external force to said element,
   d) and readout means operable to provide a measure of said force as a function of said voltage.

10. The combination of claim 9 wherein said piezoelectric force generating element is a bimorph.

11. The combination of claim 9 wherein said piezoelectric force generating element is a stack of piezoelectric blocks.

12. The combination of claim 9 including a fixed frame to which said element fixed portion is operatively connected.

13. The combination of claim 9 including a fixed frame, to which said position sensing means is operatively connected, said position sensing means including
   i) an electrically conductive element operatively connected to said force generating element, and
   ii) at least one conductive coil operatively connected to said fixed adjacent to said conductive element.

14. In combination
   i) force measuring apparatus as defined in claim 9,
   ii) a support for said apparatus in a drill string in a well,
   iii) and at least one of the following carried by the support:
      a gyroscope having significant angular momentum, operable for measuring inertial angular rate
      a balanced inertial mass operable for measuring inertial angular acceleration.

* * * * *